US010691486B2

(12) United States Patent
Gauffriau et al.

(10) Patent No.: US 10,691,486 B2
(45) Date of Patent: Jun. 23, 2020

(54) PROCESSOR COMPRISING A PLURALITY OF COMPUTATION CORES

(71) Applicant: Airbus Operations (S.A.S.), Toulouse (FR)

(72) Inventors: Adrien Gauffriau, Colomiers (FR); Benoît Triquet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 88 days.

(21) Appl. No.: 15/714,704

(22) Filed: Sep. 25, 2017

(65) Prior Publication Data
US 2018/0095784 A1 Apr. 5, 2018

(30) Foreign Application Priority Data

Oct. 5, 2016 (FR) ...................................... 16 59600

(51) Int. Cl.
| | |
|---|---|
| *G06F 9/48* | (2006.01) |
| *G06F 8/41* | (2018.01) |
| *G06F 15/173* | (2006.01) |
| *G06F 9/50* | (2006.01) |
| *G06F 13/24* | (2006.01) |
| *G06F 8/51* | (2018.01) |

(52) U.S. Cl.
CPC ............ *G06F 9/4812* (2013.01); *G06F 8/423* (2013.01); *G06F 9/5016* (2013.01); *G06F 13/24* (2013.01); *G06F 15/17331* (2013.01); *G06F 8/48* (2013.01); *G06F 8/51* (2013.01)

(58) Field of Classification Search
CPC ...... G06F 15/16; G06F 15/161; G06F 15/163; G06F 15/17381
See application file for complete search history.

(56) References Cited

U.S. PATENT DOCUMENTS

| | | | |
|---|---|---|---|
| 6,606,691 B2 * | 8/2003 | Didier ................... | G06F 13/362 710/117 |
| 7,870,351 B2 * | 1/2011 | Resnick ................ | G06F 9/3004 711/105 |

(Continued)

OTHER PUBLICATIONS

Saidi et al., "The Shift to Multicores in Real-Time and Safety-Critical Systems", IEEE, Pertinent pp. 220-220 (Year: 2015).*
Dinechin et al., "Time-Critical Computing on a Single-Chip Massively Parallel Processor", EDDA, Pertinent pp. 1-6 (Year: 2014).*
Dinechin et al., "A Clustered Manycore Processor Architecture for Embedded and Accelerated Applications", IEEE, Pertinent pp. 1-6 (Year: 2013).*

(Continued)

*Primary Examiner* — Michael Sun
(74) *Attorney, Agent, or Firm* — Jenkins, Wilson, Taylor & Hunt, P.A.

(57) ABSTRACT

A processor including computation groups, each computation group including computation cores, the processor being capable of simultaneously implementing a plurality of applications, each application being implemented by a computation core and possibly requiring a read-mode or write-mode access to an external memory connected to the processor. At least one core, called dedicated core, of at least one computation group is dedicated to management of the external memory, the management making it possible to temporally and spatially organize read-mode and write-mode accesses to the external memory of each application requiring a read or a write in the external memory implemented by the processor.

17 Claims, 2 Drawing Sheets

(56) References Cited

U.S. PATENT DOCUMENTS

| | | | | |
|---|---|---|---|---|
| 8,959,217 B2* | 2/2015 | Mayo | ............. | G06F 9/5077 |
| | | | | 709/226 |
| 2002/0174284 A1* | 11/2002 | Garcia | ............. | G06F 7/768 |
| | | | | 711/3 |
| 2015/0143089 A1* | 5/2015 | Lewis | ............. | G06F 9/4812 |
| | | | | 712/244 |
| 2015/0234640 A1 | 8/2015 | Tian et al. | | |

OTHER PUBLICATIONS

Luchese, "Runtime Library for Parallel Programming in MPPA-256 Manycore Processor", Universidade Federal Do Rio Grande, Partinent p. 17 (Year: 2013).*

French Search Report for French Application No. 1659600 dated Jun. 23, 2017.

Kim, et al., "Integrated Modular Avionics (IMA) Partition Scheduling with Conflict-Free I/O for Multicore Avionics Systems," 2014 IEEE 38th Annual Computers, Software and Applications Conference, pp. 321-331, XP032646705A, DOI: 10.1109/COMPSAC.2014.54, dated Jul. 21, 2014.

Dorier, et al., "Damaris: How to Efficiently Leverage Multicore Parallelism to Achieve Scalable, Jitter-free I/O," 2012 IEEE International Conference on Cluster Computing, IEEE, pp. 155-163, XP032266159, DOI: 10.1109/CLUSTER.2012.26 ISBN: 978-1-4673-2422-9, Sep. 24, 2012.

Vaidyanathan, et al., "Efficient Asynchronous Memory Copy Operations on Multi-Core Systems and I/OAT," 2007 IEEE International Conference on Cluster Computing, IEEE, Piscataway, NJ, USA, pp. 159-168, XP031324089, ISBN: 978-1-4244-1387-4, dated Sep. 17, 2007.

* cited by examiner

PROCESSOR COMPRISING A PLURALITY OF COMPUTATION CORES

CROSS-REFERENCE TO RELATED APPLICATION

This patent application claims priority to French patent application FR 16 59600, filed on Oct. 5, 2016, the entire disclosure of which is incorporated by reference herein.

TECHNICAL FIELD

The present disclosure relates to a processor comprising a plurality of computation cores.

BACKGROUND

Since their emergence in the second half of the twentieth century, the information processing systems have ceaselessly increased in complexity to execute increasingly computation-intensive tasks. In the past, a conventional approach for improving the capacities of the processors of the information processing systems has been to increase the operating frequency of these processors and miniaturize them more. However, this approach has shown its limitations because it was inducing strong energy consumption increases and increased processor cooling needs. A new approach then became popular and consisted in creating processors comprising multiple computation cores (hereinafter simply called cores). Two types of processors comprising multiple cores are distinguished: the so-called many core (or "manycore") processors and the multiple core processors. The many core processors differ from the multicore processors in the number of cores in one and the same processor. Thus, an order of magnitude of the number of cores in a multicore processor is ten or so cores whereas a many core processor can contain a hundred or even a thousand or so cores. The many core and multicore processors thus have different architectures, suited to the number of cores.

In general, the many core processors are organized in computation groups (or clusters) grouping together several cores sharing resources local to the computation group. The computation groups of a many core processor can communicate with one another and with resources external to the computation group by using a network internal to the processor called network on chip (NoC). A network on chip can for example be a meshed network.

Some many core processor topologies comprise two types of computation groups: the application computation groups dedicated to executing applications and the input/output computation groups dedicated to communications with resources external to the processor.

It is common practice in many core processors for each computation group to have a memory shared between the cores of the computation group. These shared memories generally have small sizes compared to the information processing code sizes and to the data that the many core processors have to manipulate. An implementation of an information processing program, implementing an application, then requires a use of a memory external to the processor. This external memory then becomes a memory shared between different applications implemented by the processor. Interferences can then appear between these different applications during writes or reads in the external memory.

It is desirable to mitigate this drawback in the prior art. It is in particular desirable to propose a mechanism which allows applications running on a many core processor to access the remote memory while guaranteeing non-interference between the different applications.

SUMMARY

According to one aspect of the present disclosure, the present disclosure relates to a processor comprising a plurality of computation groups, each computation group comprising a plurality of computation cores, the processor being capable of and configured to simultaneously implementing a plurality of applications, each application being implemented by a computation group and possibly requiring a read-mode or write-mode access to an external memory connected to the processor. At least one computation group comprises at least one core, called dedicated core, dedicated to management of the external memory, the management making it possible to temporally and spatially organize the read-mode and write-mode accesses to the external memory of each application requiring a read or a write in the external memory implemented simultaneously by the processor.

The temporal and spatial organization of the accesses to the external memory controlled by at least one core of the processor makes it possible to avoid interference between simultaneous reads and writes in the external memory and thus to reliabilize applications implemented by the processor such as critical applications.

According to one embodiment, the processor comprises at least one input/output computation group dedicated to communications with resources external to the processor, at least one of the cores of at least one input/output group serving as dedicated core managing each read-mode access to the external memory.

According to one embodiment, the processor comprises at least one application computation group dedicated to executing applications, at least one of the cores of at least one application group serving as dedicated core managing each write-mode access to the external memory.

According to one embodiment, when the processor comprises a plurality of dedicated cores, the dedicated cores are synchronized on a common clock.

According to one embodiment, each dedicated core is capable of and configured for checking, for each application with which it is concerned, that the writes and reads corresponding to an application proceed correctly in a storage logic unit allocated for the application in the external memory.

According to one embodiment, each dedicated core guarantees a temporal segregation of the reads and writes in the external memory by on the one hand grouping the writes together and on the other hand grouping the reads together so as to prevent at least one write from being inserted between two reads or at least one read from being inserted between two writes.

According to one embodiment, the processor is capable of and configured for implementing a plurality of predefined programming interfaces, each programming interface of the plurality allowing an application requiring a read or write in external memory to call a dedicated core for it to perform the read or write.

According to one embodiment, one programming interface of the plurality uses a predefined configuration table in which the time is divided into periods, each time period being associated with reads or writes in external memory to be performed during the period by a dedicated processor on behalf of a predetermined application.

According to one embodiment, one programming interface of the plurality allows an application to request reads or writes in external memory asynchronously and uses a configuration table in which are defined types of read or write in external memory having different characteristics, each type of read or write in external memory being associated with an identifier, an application being able to recall one of the identifiers for a dedicated core to implement a type of read or write in external memory corresponding to the identifier.

According to one embodiment, one programming interface of the plurality allows an application to request reads or writes in external memory asynchronously by allowing the application to indicate to a dedicated core characteristics of a read or write to be implemented by the dedicated core computed dynamically by the application.

According to a second aspect of the disclosure herein, the disclosure herein relates to an aircraft comprising a computation unit comprising at least one processor according to the first aspect.

BRIEF DESCRIPTION OF THE DRAWINGS

The above-mentioned features of the present disclosure, and others, will become more clearly apparent on reading the following description of an exemplary embodiment, the description being given in relation to the attached drawings, in which.

DETAILED DESCRIPTION

The following detailed description sets out to describe an embodiment of the present disclosure in a context of a many core processor. The principles of the present disclosure do however apply to a wider context and could be applied to processors comprising multiple cores such as multicore processors. Moreover, the disclosure herein is implemented in a vehicle of aircraft type. It could however be implemented in any other vehicle, such as a motor vehicle, a drone, etc. The disclosure herein could also be implemented in a context other than a vehicle, on all devices or appliances comprising a many core or multicore processor.

Figure 1:
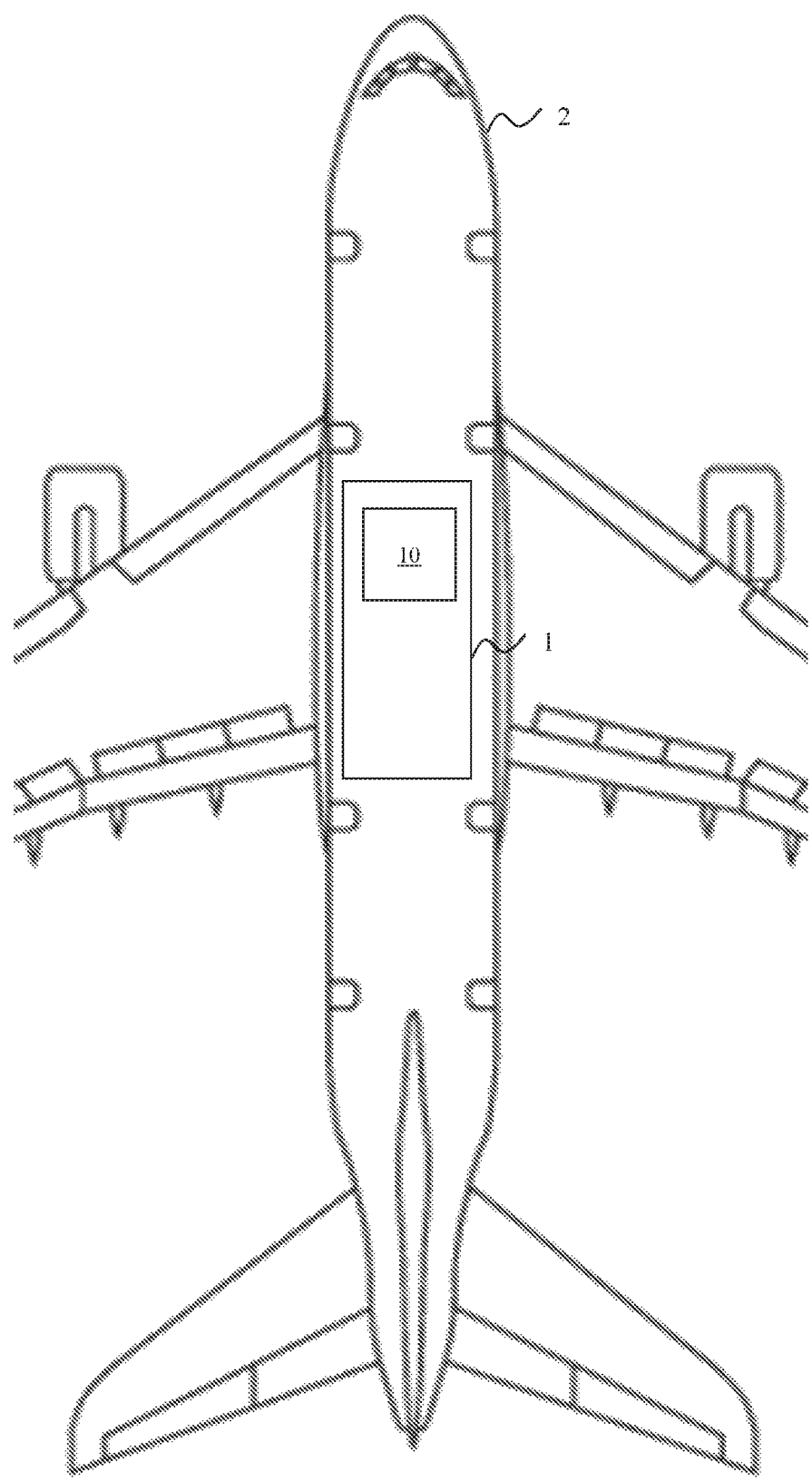
FIG. 1 schematically illustrates an example of a vehicle in which the disclosure herein is implemented.

FIG. 1 schematically illustrates an example of a vehicle in which the disclosure herein is implemented. The vehicle is an aircraft 2. This aircraft 2 comprises a computation unit 1 responsible in particular for managing the piloting commands. This computation unit 1 comprises a many core processor 10 described in detail in relation to FIG. 2.

Figure 2:
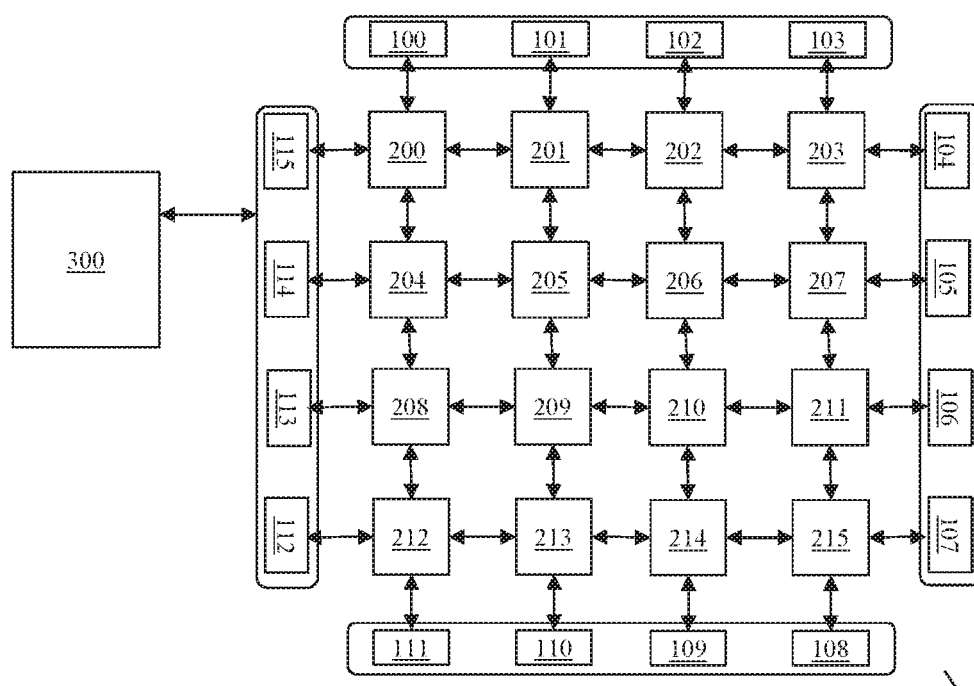
FIG. 2 schematically illustrates an example of many core processors.

FIG. 2 schematically illustrates an example of the many core processor 10.

The many core processor 10 comprises a plurality of application computation groups 200 to 215 (here "16" application computation groups) and a plurality of input/output computation groups 100 to 115 (here "16" input/output computation groups). At least one of the input/output computation groups is suitable for communicating with an external memory 300, for example of DDR SDRAM (Double data Rate Synchronous Dynamic Random Access Memory) type. The communications between the computation groups (application and/or input/output) use a meshed network on chip NoC. In this meshed network on chip NoC, each application computation group is linked to "4" other computation groups (application and/or input/output) and each input/output computation group is linked to an application computation group. Each input/output computation group comprises a plurality of cores, called input/output cores.

Figure 3:
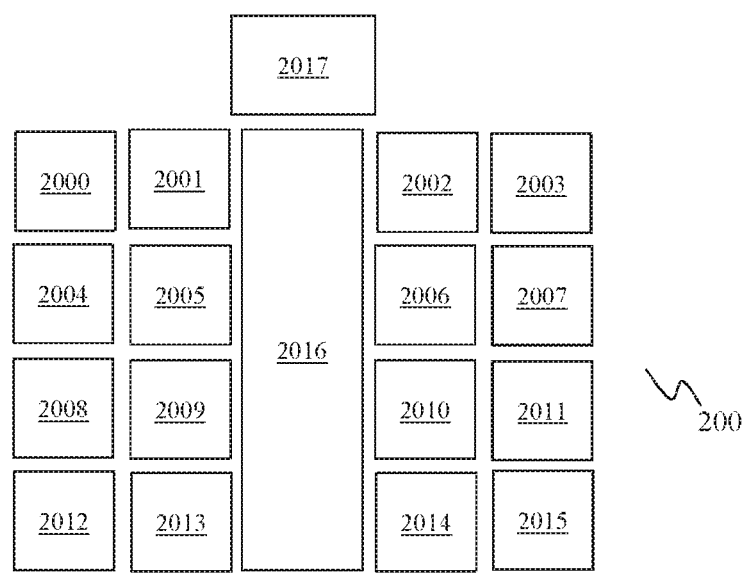
FIG. 3 schematically illustrates an example of computation group.

FIG. 3 schematically illustrates an example of application computation group 200.

The application computation group 200 comprises "16" cores numbered from 2000 to 2015, called application cores, a shared internal memory 2016, and a resource management core 2017. The resource management core 2017 has privileges which make it possible to configure different resources of the application computation group 200 and in particular to configure the network on chip NoC. Another role of the resource management core is to check and send over the network on chip NoC read/write requests coming from the application cores of the application computation group 200. All the computation groups of the many core processor 10 are assumed identical to the application computation group 200.

In the processor 10, at least one input/output core executes a master process generating slave processes. Each slave process is executed by an application computation group. When an application computation group implements an application, at least one application core of this group takes responsibility for executing the application. When the application is broken down into multiple parallel tasks ("multi-thread"), multiple application cores of the application computation group may be involved in parallel in the execution of the application. The application cores share the shared internal memory 2016 in the execution of the tasks.

The many core processor 10 comprises an application computation group dedicated to management of the external memory 300. In this application computation group, at least one core is dedicated to management of the external memory 300. It is important for each application core to go through a core dedicated to management of the external memory 300 to access the external memory 300. Each access to the external memory 300 is thus controlled by the dedicated core, which can choose different policies for accessing the external memory 300. For example, each dedicated core can guarantee:

a temporal organization (or segregation) of the accesses to the external memory 300. Inserting a write in memory between two reads in memory (conversely inserting a read in memory between two writes in memory) results in waiting times (latencies) which induce interferences between the applications. In effect, the memory access times of an application can become dependent on another application. The temporal segregation of the accesses to the memory consists in or comprises on the one hand grouping the writes together and on the other hand grouping the reads together, so as to prevent, as far as possible, at least one write being inserted between two reads and at least one read being inserted between two writes;

a spatial organization (or segregation) of the accesses to the external memory 300 between the various applications implemented by the many core processor 10. Thus, two applications having to write simultaneously in the external memory 300 will use memory areas that are far enough apart spatially to avoid any interference. It is common practice to divide a memory into storage logic units ("memory banks"). Accesses to different storage logic units are by definition carried out without interference;

priority accesses for certain cores to the external memory 300;

accesses with guaranteed or random latencies to the external memory 300.

Guaranteeing priority accesses and/or accesses with guaranteed latencies to the external memory 300, providing a temporal and spatial segregation of the accesses to the external memory 300, makes it possible to increase the reliability of certain applications such as the critical applications for which a malfunction could have dramatic consequences.

In one embodiment, at least one of the input/output cores of one of the input/output computation groups 100-115 of the many core processor 10 serves as dedicated core managing each read-mode access to the external memory 300. Moreover, at least one of the resource management cores of one of the application computation groups 200-215 serves as dedicated core managing each write-mode access to the external memory 300. Each dedicated core involved in the write-mode or read-mode accesses to the external memory 300 contributes to an implementation of an external memory management process. The external memory management process prevents the read/write-mode accesses in external memory 300 from interfering with one another.

In one embodiment, the dedicated cores contributing to the implementation of the external memory management process are synchronized on a common clock, which allows the dedicated cores to implement read windows and write windows. During a read window, a dedicated core will carry out only reads in external memory 300. During a write window, a dedicated core will carry out only writes in memory. In this way, a temporal segregation of the accesses to the external memory 300 is assured.

In one embodiment, the applications implemented by the many core processor 10 never share the same storage logic unit of the external memory 300. Each dedicated core involved in the write-mode or read-mode accesses to the external memory 300 checks, for each application with which it is concerned, that the writes and reads corresponding to an application are carried out correctly in a storage logic unit allocated for the application in the external memory 300.

As stated above, each application requiring a read/write in external memory 300 must go through a dedicated core because it is that which performs the checks preventing the interferences. For this, each application implemented by the processor 10 must, mandatorily, use predefined APIs (application programming interfaces) to be able to access the external memory 300 in read/write mode. In this way, the security of the accesses to the external memory 300 is reinforced. These APIs make it possible to call a dedicated core to actually perform the reads/writes in external memory 300 necessary to the running of an application.

A first API, called statically defined periodic transfer API makes it possible to automatically manage, in place of an application, reads/writes in external memory 300 for the application. Each read/write is defined statically in a configuration table. In this configuration table, the time is divided into periods. This configuration table comprises, for each time period, information representative of reads/writes to be performed during this period. Each item of information representative of reads/writes comprises a source address of data to be read, a destination address of the data read, an identifier of the application and a size of the data to be read.

In the case of a read, the source address is located in the external memory 300. In the case of a write, the source address is located in the shared internal memory of the application computation group involved in the implementation of the application. In the case of a read, the destination address is located in the shared internal memory of the application computation group involved in the implementation of the application. In the case of a write, the destination address is located in the external memory 300. Each dedicated core then reads the configuration table and implements the reads/writes in which it is involved. Each read and write is performed by ensuring the properties of spatial and temporal segregation described previously. The statically defined period transfer API is particularly suited to strict real time applications such as applications for flight command management in an aircraft. In one embodiment, the statically defined period transfer API can be blocking or non-blocking, that is to say that a call to this API for a read/write can prevent (i.e. blocking API) any other read/write involving the external memory 300.

A second API, called statically defined aperiodic transfer API allows aperiodic reads/writes. This API allows an application to request reads/writes asynchronously. This second API defines a plurality of types of read/write, each type of read/write having different characteristics. A configuration table defines each type of read/write of the plurality. In the configuration table, each type of read/write of the plurality is associated with an identifier and with information representative of characteristics of the type of read/write. This information representative of characteristics of the type of read/write comprises a source address of the data to be read, a destination address of the data read, and a size of the data to be read. When an application wants to implement a read/write in the context of this API, it calls the identifier of the type of read/write desired. A dedicated core then performs each read/write corresponding to the type called at the time of the call. Each read and write is performed by ensuring the properties of spatial and temporal segregation described previously.

In one embodiment, the statically defined aperiodic transfer API can be blocking or non-blocking, that is to say that a call to this API for a read/write can prevent (i.e. blocking API) any other read/write involving the external memory 300.

The second API is particularly suited to the applications which react to external events but which have systematic and identical processing operations on these events.

A third API, called dynamically defined aperiodic transfer API, also allows aperiodic reads/writes. This third API allows an application to request reads/writes asynchronously. Unlike the second API, in this third API, no type of read/write is predefined. Each characteristic of a read/write (i.e. source address of the data to be read, destination address of the data read, and size of the data to be read) is computed dynamically by the application using the third API. Each characteristic is then passed to the dedicated core responsible for implementing the read/write. Each read and write is performed by ensuring the properties of spatial and temporal segregation described previously. The third API is particularly suited to the dynamic applications of which certain elements are computed during the execution of the application.

In one embodiment, the dynamically defined aperiodic transfer API can be blocking or non-blocking, that is to say that a call to this API for a read/write can prevent (i.e. blocking API) any other read/write involving the external memory 300.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A processor comprising a plurality of computation groups, each computation group comprising a plurality of computation cores, the processor being capable of simultaneously implementing a plurality of applications, each application being implemented by a computation group of the plurality of computation groups and requiring read-mode or write-mode access to an external memory connected to the processor, wherein:
at least one computation group comprises at least one dedicated core that is dedicated to management of the external memory, the management making it possible to temporally and spatially organize read-mode and write-mode accesses to the external memory of each application requiring one or more reads or writes in the external memory implemented by the processor; and
wherein the at least one dedicated core is configured to guarantee a temporal segregation of the reads and writes in the external memory by grouping the writes and grouping the reads together so as to prevent at least one write from being inserted between two reads or at least one read from being inserted between two writes; and
wherein the at least one dedicated core is configured to provide read and write access to the external memory with guaranteed or random latencies.

2. The processor as claimed in claim 1, wherein the processor comprises a plurality of dedicated cores, wherein the plurality of dedicated cores are synchronized on a common clock.

3. The processor as claimed in claim 1, wherein the processor comprises at least one input/output computation group dedicated to communications with resources external to the processor, at least one core of the at least one input/output group serving as a dedicated core managing each read-mode access to the external memory.

4. The processor as claimed in claim 3, wherein the processor comprises a plurality of dedicated cores, wherein the plurality of dedicated cores are synchronized on a common clock.

5. The processor as claimed in claim 3, wherein the processor comprises at least one application computation group dedicated to executing applications, at least one core of the at least one application group serving as a dedicated core managing each read-mode access to the external memory.

6. The processor as claimed in claim 5, wherein the processor comprises a plurality of dedicated cores, wherein the plurality of dedicated cores are synchronized on a common clock.

7. The processor as claimed in claim 1, wherein the processor comprises at least one application computation group dedicated to executing applications, at least one core of at the least one application group serving as a dedicated core managing each read-mode access to the external memory.

8. The processor as claimed in claim 7, wherein the processor comprises a plurality of dedicated cores, wherein the plurality of dedicated cores are synchronized on a common clock.

9. The processor as claimed in claim 1, wherein the at least one dedicated core is configured to check, for each application with which it is concerned, that writes and reads, corresponding to a respective application, proceed correctly in a storage logic unit allocated for the application in the external memory.

10. The processor as claimed in claim 9, wherein the processor comprises at least one application computation group dedicated to executing applications, at least one core of the at least one application group serving as a dedicated core managing each read-mode access to the external memory.

11. The processor as claimed in claim 1, wherein the processor is capable of implementing a plurality of predefined programming interfaces, each programming interface of the plurality being configured to allow an application requiring a read or write in the external memory to call a dedicated core for it to perform the read or write.

12. The processor as claimed in claim 11, wherein the processor comprises at least one application computation group dedicated to executing applications, at least one core of the at least one application group serving as dedicated core managing each read-mode access to the external memory.

13. The processor as claimed in claim 12, wherein the at least one dedicated core is configured to check, for each application with which it is concerned, that writes and reads, corresponding to a respective application, proceed correctly in a storage logic unit allocated for the application in the external memory.

14. The processor as claimed in claim 11, configured such that one programming interface of the plurality uses a predefined configuration table in which time is divided into periods, each time period being associated with reads or writes in the external memory to be performed during the period by a dedicated processor on behalf of a predetermined application.

15. The processor as claimed in claim 11, configured such that one programming interface of the plurality allows an application to request reads or writes in the external memory asynchronously and uses a configuration table in which are defined types of read or write in the external memory having different characteristics, each type of read or write in the external memory being associated with an identifier, an application being able to call one of the identifiers for a dedicated core to implement a type of read or write in the external memory corresponding to the identifier.

16. The processor as claimed in claim 11, configured such that one programming interface of the plurality allows an application to request reads or writes in the external memory asynchronously by allowing the application to indicate to a dedicated core characteristics of a read or write to be implemented by the dedicated core computed dynamically by the application.

17. An aircraft comprising a computation core comprising at least one processor, the processor comprising a plurality of computation groups, each computation group comprising a plurality of computation cores, the processor being capable of simultaneously implementing a plurality of applications, each application being implemented by a computation group and possibly requiring read-mode or write-mode access to an external memory connected to the processor, wherein:

at least one computation group comprises at least one dedicated core that is dedicated to management of the external memory, the management making it possible to temporally and spatially organize read-mode and write-mode accesses to the external memory of each application requiring a read or a write in the external memory implemented by the processor; and wherein the at least one dedicated core is configured to guarantee a temporal segregation of the reads and writes in the external memory by grouping the writes and grouping the reads together so as to prevent at least one write from being inserted between two reads or at least one read from being inserted between two writes; and wherein the at least one dedicated core is further configured to provide read and write access to the external memory with guaranteed or random latencies.

* * * * *